United States Patent

Starzewski

[11] Patent Number: 6,040,403
[45] Date of Patent: Mar. 21, 2000

[54] NICKEL CATALYSTS FOR POLYMERIZATION

[75] Inventor: Karl-Heinz Aleksander Ostoja Starzewski, Bad Vilbel, Germany

[73] Assignee: Bayer Aktiengesellschaft, Leverkusen, Germany

[21] Appl. No.: 08/928,001

[22] Filed: Sep. 11, 1997

[30] Foreign Application Priority Data

Sep. 12, 1996 [DE] Germany ............... 196 37 019

[51] Int. Cl.$^7$ .................. C08F 4/80; C08F 4/44; C08F 4/06; C07F 15/00
[52] U.S. Cl. .............. 526/171; 526/171; 526/165; 526/135; 556/16
[58] Field of Search .................. 526/165, 171, 526/135

[56] References Cited

U.S. PATENT DOCUMENTS

| | | | |
|---|---|---|---|
| 3,674,759 | 7/1972 | Yamawaki et al. | 526/133 |
| 4,537,982 | 8/1985 | Starzewski et al. | |
| 4,620,021 | 10/1986 | Starzewski et al. | |
| 4,691,036 | 9/1987 | Starzewski et al. | |
| 5,155,188 | 10/1992 | Goodall | 526/165 |
| 5,198,511 | 3/1993 | Brown-Wensley et al. | 526/113 |
| 5,296,566 | 3/1994 | Brown-Wensley et al. | 526/171 |
| 5,525,688 | 6/1996 | Novak et al. | 526/135 |

FOREIGN PATENT DOCUMENTS

| | | |
|---|---|---|
| 0 101 927 | 3/1983 | European Pat. Off. |
| 0 137 389 | 4/1985 | European Pat. Off. |
| 0 193 047 | 9/1986 | European Pat. Off. |
| 0 445 755 A2 | 9/1991 | European Pat. Off. |
| 0 608 903 | 8/1994 | European Pat. Off. |
| 3700196 A1 | 8/1988 | Germany ............ C08F 20/00 |
| WO 95/14048 | 5/1995 | WIPO . |

OTHER PUBLICATIONS

W. Kaminsky, "Zirconocene catalysts for olefin polymerization" Catalysis Today vol. 20 (1994) pp. 257–271.

N. Calderon et al., "Ring–opening Polymerization of Unsaturated Alicyclic Compounds" Journal of Polymer Science: Part A–1, vol. 5 (1967) pp. 2209–2217.

H. Cherdron et al., Angew. Makromol. Chem. 223 (1994), pp. 121–133.

Morrison & Boyd "Organic Chemistry" 6–th ed, 1992, pp 200,401–402,413,501–2,562.

Journal of Molecular catalysis, 90 (11994), pp 201–211.

*Primary Examiner*—David W. Wu
*Assistant Examiner*—T. Zalukaeva
*Attorney, Agent, or Firm*—Norris, McLaughlin & Marcus, P.A.

[57] ABSTRACT

A method for the polymerization of cycloolefins in a presence of a nickel (0) compound or a compound which can be converted in situ into a nickel (0) compound, as a catalyst. The catalyst of the present invention exhibits very high catalytic activity towards polymerization of cycloolefins.

5 Claims, No Drawings

NICKEL CATALYSTS FOR POLYMERIZATION

The invention relates to the use of nickel catalysts for the polymerization of cycloolefins.

Polymers obtainable by polymerization of cycloolefins, in the presence or absence of acyclic olefins, have in recent times attracted interest because new optical applications are placing ever higher demands on the property profile of the thermoplastics to be used. Polycycloolefins are extraordinarily thermally stable and optically isotropic, and highly resistant to water and organic solvents.

Owing to their high optical transparency, low double refraction and high softening temperatures, cycloolefin homopolymers and copolymers are particularly suitable as raw materials for producing optical lenses and optical waveguides and also as information storage media, for example for compact discs.

Attempts have been made in the past to polymerize cycloolefins with the aid of Ziegler systems based on titanium compounds, vanadium compounds and metallocenes, cf. H. Cherdron et al., Angew. Makromol. Chem. 223 (1994), 121–133 and the literature cited therein. Since the structural and property diversity of the polycycloolefins obtained increases with the number of catalysts suitable for cycloolefin polymerization and the polycycloolefins known hitherto do not yet meet all expectations, there was a need for cycloolefin polymerization catalysts which are structurally different from the known cycloolefin polymerization catalysts.

EP-A-445 755 describes a process for the polymerization of cycloolefins of the norbornene type in the presence of a catalyst based on a transition metal of groups Vb, VIb, VIIb or VIII and an aluminoxane as cocatalyst. The preferred transition metals are nickel and palladium. The highest activity is shown by the catalyst system of Example 1 (23.6 kg of polymer/g of nickel, based on a polymerization time of 4 hours). For a polymerization on an industrial scale, an improved activity would be desirable. WO/14 048 discloses a process for the polymerization of cyclic olefins according to which use is made of a catalyst system based on an ionic transition metal (VIII) compound and a chain-transfer agent. Although polymerization using these catalyst systems appears promising, the catalyst activities are too low for use on an industrial scale. A further object of the invention was thus to provide suitable catalysts having improved activity for the polymerization of cycloolefins.

It has now been found that selected nickel compounds are highly active catalysts for the polymerization of cycloolefins: the weight ratio of catalyst used to polymer produced becomes extremely low.

The invention accordingly provides for the use of reaction products of

A. a nickel(0) compound or a compound which can be converted in situ into a nickel(0) compound, with, optionally, B. a compound of the formula $$R^1R^2R^3 \overset{\oplus}{E}-X^{\ominus} \quad (I)$$

and (obligatorily)

C. a compound of the formula

(II)

as catalysts for the polymerization of cycloolefins, where $R^1$ to $R^6$ are, independently of one another, straight-chain or branched $C_1$–$C_{20}$-alkyl, $C_1$–$C_{20}$-alkoxy, $C_3$–$C_8$-cycloalkyl, $C_2$–$C_{20}$-alkenyl, di-($C_1$–$C_4$-alkyl)amino, $C_6$–$C_{12}$-aryloxy, $C_7$–$C_{15}$-aralkyl or $C_7$–$C_{15}$-aralkoxy, E and F are, independently of one another, nitrogen, phosphorus, arsenic or antimony, X is oxygen, sulphur, $=NR^9$, $=CR^9R^{10}$, $=C=C=O$, $=C=C=S$, $=C=PR^1R^2R^3$, Y is oxygen or $NR^9$, $R^7$, $R^8$ are, independently of one another, hydrogen, $C_1$–$C_{20}$-alkyl, $C_2$–$C_{20}$-alkenyl, $C_1$–$C_{20}$-alkoxy, $C_3$–$C_8$-cycloalkyl, $C_6$–$C_{12}$-aryl, $C_6$–$C_{12}$-aryloxy, $C_6$–$C_{12}$-ar-$C_1$–$C_{20}$-alkyl, $C_6$–$C_{12}$-ar-$C_1$–$C_{20}$-alkoxy, $C_1$–$C_{20}$-alkyl-$C_6$–$C_{12}$-aryl, $C_1$–$C_{20}$-alkyl-$C_6$–$C_{12}$-aryloxy, chlorine, cyano, $NHR^2$, $NR^{12}{}_2$, $OR^{12}$, $COOR^{12}$, $COOR^{11}$, $CONR^{12}$, $COR^{12}$, $SR^{12}$, $SO_2R^{12}$, $OSO_2R^{12}$, $P(O)(OR^{12})_{2-y}R^{13}{}_y$, $R^7$ may also be $SO_3R^{11}$ or $R^7$ and $R^8$ together with the two carbon atoms to which they are bound form an isocyclic or heterocyclic ring, $R^9$ and $R^{10}$ are, independently of one another, $R^1$ or hydrogen, silyl, acyl, chlorophenyl, nitrophenyl, $C_1$–$C_6$-alkylphenyl, cyano, phenyl-$C_2$–$C_6$-alkenyl, silyl, trihalogenosilyl, tri-$C_1$–$C_{30}$-organosilyl, $C_1$–$C_{16}$-acyl, cyano, halogen, tri-$C_1$–$C_{30}$-organostannyl, -$BH_2$, di-$C_1$–$C_{20}$-organoboranyl, dihalogenoboranyl, $R^{11}$ is an alkali metal, thallium, 1/2 alkaline earth metal, ammonium, phosphonium, $C_1$–$C_{12}$-alkyl or $C_6$–$C_{12}$-aryl, $R^{12}$, $R^{13}$ are, independently of one another, $C_1$–$C_{20}$-alkyl, $C_2$–$C_{20}$-alkenyl, $C_3$–$C_8$-cycloalkyl or $C_6$–$C_{12}$-aryl and y is zero, 1 or 2.

The term alkyl in the definitions of $R^1$ to $R^3$ represents straight-chain or branched alkyl having preferably from 1 to 12, particularly preferably from 1 to 6 and in particular from 1 to 4, carbon atoms. Examples which may be mentioned are methyl, ethyl, n-propyl, i-propyl, n-butyl, sec-butyl, i-butyl, t-butyl, n-pentyl, i-pentyl, t-pentyl, hexyl, i-octyl, n-decyl and n-dodecyl.

The term alkenyl in the definitions of $R^1$ to $R^{13}$ represents straight-chain or branched alkenyl having preferably from 2 to 18, particularly preferably from 2 to 12 and very particularly preferably from 2 to 6, carbon atoms. Examples which may be mentioned are vinyl, allyl, 2-propenyl, 1-butenyl, 2-butenyl, 3-butenyl, ethinyl, 1-propinyl, 2-propinyl, 1-butinyl, 2-butinyl, 3-butinyl, methallyl, crotyl and cinnamyl.

The term cycloalkyl in the radicals $R^1$ to $R^{13}$ represents cycloalkyl having preferably from 3 to 7, in particular 3, 5 or 6, carbon atoms. Examples which may be mentioned are unsubstituted or substituted cyclopropyl, cyclobutyl, cyclopentyl, cyclohexyl and cycloheptyl.

The term aryl in the radicals $R^1$ to $R^{13}$ represents unsubstituted or substituted aryl having preferably from 6 to 10 carbon atoms in the aryl part. Preferred examples include phenyl and naphthyl. The aryl groups can bear from 1 to 3 substituents selected from the group consisting of halogen (in particular chlorine and/or fluorine), $C_1$–$C_4$-alkoxy, cyano, nitro or amino. The term aryl also includes heteroaryl, where heteroaryl represents heteroaryl which has from 1 to 5 carbon atoms and from 1 to 4 hetero atoms selected from the group consisting of oxygen, sulphur and nitrogen and may optionally be monosubstituted or polysubstituted by identical or different substituents and to which a 5- to 6-membered, saturated or unsaturated carbocycle is optionally fused, where heteroaryl preferably represents pyridyl, pyrimidyl, pyrazinyl, quinolyl, isoquinolyl, pyrrolyl, indolyl, pyrazolyl, imidazolyl, benzimidazolyl, triazolyl, thienyl, benzothienyl, furyl, benzofuryl, thiazolyl, benzothiazolyl, isothiazolyl, oxazolyl, benzoxazolyl, isoxazolyl, thiadiazolyl, isothiadiazolyl, oxadiazolyl or isoxadiazolyl, each of which may optionally be monosubstituted to trisubstituted by identical or different substituents, where heteroaryl substituents which may be mentioned are: fluorine, chlorine, bromine, iodine, cyano, nitro, hydroxy, mercapto, amino, straight-chain or branched alkoxy or straight-chain or branched alkylthio each having from 1 to 4 carbon atoms, straight-chain or branched halogenoalkoxy or straightchain or branched halogenoalkylthio each having from 1 to 4 carbon atoms and 1 to 9 fluorine and/or chlorine atoms, phenyl, phenoxy, phenylthio, phenyl-$C_1$–$C_2$-alkoxy or phenyl-$C_1$–$C_2$-alkylthio.

The term aralkyl in the radicals $R^1$ to $R^{13}$ represents compounds having preferably from 1 to 12, in particular from 1 to 6, carbon atoms in the straight-chain or branched alkyl part and preferably phenyl or naphthyl as aryl part. Examples of such aralkyl groups include benzyl, α-methylbenzyl, α,α-dimethylbenzyl, 2-phenylethyl, α- and β-naphthylmethyl. These aralkyl radicals can bear from 1 to 3 substituents selected from the group consisting of halogen (in particular chlorine and/or fluorine), nitro, cyano, optionally halogenated $C_1$–$C_4$-alkyl or -alkoxy such as methyl, ethyl, trifluoromethyl, difluorochloromethyl, difluorochloromethyl, trichloromethyl, methoxy, ethoxy, trifluoromethoxy, difluorochloromethoxy or difluoromethoxy, optionally halogenated $C_1$–$C_4$-alkylmercapto such as methylmercapto, trifluoromethylmercapto, difluorochloromethylmercapto.

The term alkylaryl in the radicals $R^1$ to $R^{13}$ represents the abovementioned aryl groups which in turn bear from 1 to 3 substituents selected from the group consisting of $C_1$–$C_4$-alkyl, halogeno-$C_1$–$C_2$-alkyl (such as trifluoromethyl, difluoromethyl).

The term alkoxy in the radicals $R^1$ to $R^{13}$ represents straight-chain and branched alkoxy having preferably from 1 to 6, in particular from 1 to 4, carbon atoms. Preferred examples include methoxy, ethoxy, n- and i-propoxy, n-, i-, sec- and tert-butoxy as well as hexoxy.

The term aryloxy in the radicals $R^1$ to $R^{13}$ represents compounds having preferably from 1 to 10 carbon atoms in the aryl part. Preferred examples are phenoxy and naphthoxy. The aryloxy groups can bear from 1 to 3 substituents selected from the group consisting of halogen (preferably chlorine and/or fluorine), $C_1$–$C_4$-alkyl, halogeno-$C_1$–$C_2$-alkyl (such as difluoromethyl and trifluoromethyl), cyano, nitro or amino.

The term alkylamino in the radicals $R^1$ to $R^{13}$ represents monoalkylamino and dialkylamino radicals each preferably having from 1 to 4 carbon atoms in the respective straight-chain or branched alkyl parts, where in the case of dialkylamino, the two radicals together with the nitrogen atom to which they are bound may form a 5- or 6-membered, saturated ring which optionally contains an oxygen, sulphur or nitrogen atom and which is optionally substituted by one or two methyl groups, or represents straight-chain or branched alkenyloxy or straight-chain or branched alkinyloxy each having from 3 to 4 carbon atoms. The term alkylamino thus includes, for example, methylamino and dimethylamino, ethylamino and diethylamino, n-propylamino and di-n-propylamino, i-propylamino and di-i-propylamino, methylbutylamino, ethylbutylamino, pyrrolidino, piperidino, morpholino, thiomorpholino, N-methylpiperazino, 2,6-dimethylmorpholino.

The term arylamino in the radicals $R^1$ to $R^{13}$ represents

where $R^{14}$ represents hydrogen or $C_1$–$C_{12}$-alkyl, preferably hydrogen or methyl, and $R^{15}$ represents aryl or heteroaryl having preferably from 3 to 10 carbon atoms, in particular (i) phenyl which is optionally monosubstituted to pentasubstituted by identical or different halogenoalkyl, halogenoalkoxy, halogenoalkylthio, halogenoalkylsulphinyl or halogenoalkylsulphonyl groups each having 1 or 2 carbon atoms and from 1 to 5 identical or different halogen atoms, by halogen, cyano, nitro, amino, hydroxy, carbamoyl and/or thiocarbamoyl or by doubly linked dioxyalkylene which has 1 or 2 carbon atoms and may optionally be monosubstituted to tetrasubstituted by halogen and/or halogenomethyl, where the oxygen atoms are not adjacent, for example unsubstituted phenyl itself or phenyl which is monosubstituted to tetrasubstituted by identical or different difluoromethyl, trifluoromethyl, trifluoroethyl, difluoromethoxy, trifluoromethoxy, difluorochioromethoxy, trifluoroethoxy, difluoromethylthio, difluorochloromethylthio, trifluoromethylthio, trifluoromethylsulphinyl, trifluoromethylsulphonyl, fluorine, chlorine, bromine, cyano, nitro, carbamoyl and/or thiocarbamoyl substituents or by a doubly linked radical of the formula —O—$CH_2$—O—, —O—$CF_2$—O—, —O—$CH_2$—$CH_2$—O—, —O—CFCl—CFCl—O—,

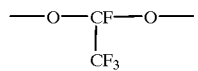

or —O—$CF_2$—$CF_2$—O—; or (ii) heteroaryl having from 2 to 10 carbon atoms and from 1 to 4 heteroatoms selected from the group consisting of nitrogen, oxygen and sulphur, where these heteroaryl radicals may be monosubstituted to trisubstituted by identical or different halogenoalkyl, halogenoalkoxy, halogenoalkylthio, halogenoalkylsulphinyl or halogenoalkylsulphonyl groups each having 1 or 2 carbon atoms and from 1 to 5 identical or different halogen atoms, by halogen, cyano, nitro, amino, hydroxy, carbamoyl and/or thiocarbamoyl, for example pyrrolidinyl, piperidinyl, furyl, thienyl, pyrazolyl, imidazolyl, 1,2,3- and 1,2,4-triazolyl, oxazolyl, isoxazolyl, thiazolyl, isothiazolyl, 1,2,3-, 1,3,4-, 1,2,4- and 1,2,5-oxadiazolyl, azepinyl, pyrrolyl, isopyrrolyl, pyridyl, piperazinyl, pyridazinyl, pyrimidinyl, pyrazinyl, 1,3,5-, 1,2,4- and 1,2,3-triazinyl, 1,2,4-, 1,3,2-, 1,3,6- and 1,2,6-oxazinyl, oxepinyl, thiepinyl, 1,2,4-diazepinyl, quinolyl, isoquinolyl, quinazolyl, quinoxalyl, cinnolyl, tetrazolyl, indolyl, indazolyl, benzimidazolyl, benzothienyl, benzofuryl, benzothiazolyl, benzoxazolyl, thiadiazolyl, isothiadiazolyl, oxadiazolyl and isoxadiazolyl and their substitution products.

The preferred arylamino is anilino.

Component A

Nickel(0) compounds which may be mentioned by way of example are Ni(cyclooctadiene)$_2$ and Ni(allyl)$_2$. Examples of nickel compounds which can be converted in situ into nickel(0) compounds are: nickel acetylacetonate, nickel octanoate and nickel stearate which can be reduced by means of customary reducing agents such as boranate, alanate, aluminium alkyls or organolithium compounds.

Component B

Preferably, $R^1$ to $R^3$ are, independently of one another, $C_6$–$C_{12}$-aryl or $C_1$–$C_6$-alkyl.

E is preferably phosphorus.

In a preferred embodiment, X represents $CH_2$, CH-phenyl, CH-trimethylsilyl and $C(CN)_2$, CH-vinyl, CH-propenyl and CH-styryl and CH-acyl, in particular CH-formyl, CH-acetyl, CH-benzoyl, CH-carbomethoxy, and also $C(acetyl)_2$ and $C(benzoyl)_2$, $C(trimethylsilyl)_2$, NH, N-methyl, N-ethyl, N-propyl, N-butyl, N-t-butyl, N-trimethylsilyl, N-triphenylsilyl, N-phenyl, N-tolyl or oxygen.

Component C

Preferably, $R^4$ to $R^6$ represent, independently of one another, $C_6$–$C_{12}$-aryl or $C_1$–$C_6$-alkyl; $R^4$ is particularly preferably $C_6$–$C_{12}$-aryl.

Q is preferably phosphorus.

$R^7$ and $R^8$ preferably represent, independently of one another, hydrogen, $C_1$–$C_6$-alkyl, $C_6$–$C_{12}$-aryl, $R^7$ may also be $C_1C_{13}$-acyl or $SO_3Na$, $S_3$—$C_1$–$C_{12}$-alkyl, $SO_3$–N+($C_1$–$C_{12}$-alkyl)$_4$, $R^8$ may also be $OR^{12}$ and $R^7$ and $R^8$ together with the two carbon atoms to which they are bound may also form a 5- or 6-membered ring.

As compounds of the formula (II) in which $R^7$ and $R^8$ together with the two carbon atoms form a ring, use can be made, for example, of the adducts of a quinoid compound or maleic anhydride with a phosphine of the formula $R^4R^5R^6P$.

Reaction Product of A, Optionally B and C

To prepare the catalyst, from 0 to 4 mol of the compound of the formula (I) and from 1 to 4 mol of the compound of the formula (II) are used per mol of nickel(0) compound, preferably about 1 mol of the compound of the formula (I) and about 1 mol of the compound of the formula (II) per mol of the nickel(0) compound.

The temperature in the preparation of the catalyst is from 0 to 100° C., preferably from 20 to 70° C. The preparation is carried out with exclusion of oxygen, preferably in a solvent which has to be inert toward the reactants, for example benzene, toluene, cyclohexane or n-hexane. After its preparation, the catalyst is usually isolated as a solid by filtration; if necessary, the solution may be concentrated and/or cooled beforehand. However, the catalyst can also be used directly without isolation, i.e. as solution or suspension, for the polymerization according to the invention.

The preferred nickel compounds where Q=phosphorus and Y=oxygen have, according to present knowledge, the structural feature of a chelating phosphorus-oxygen ligand of the formula

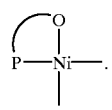

(III)

According to a particularly preferred embodiment, use is made of catalysts which are prepared using not only component C (formula II) but also component B (formula I). Such particularly preferred catalysts correspond to the formula (IV)

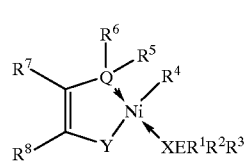

(IV)

where

E, Q, X, Y and $R^1$ to $R^8$ are as defined above. Particularly preferred catalysts are compounds of the formula (IV) in which E and F are phosphorus, X is oxygen, $NR^9$, $CR^9R^{10}$ and Y is oxygen or $NR^9$.

Most of the catalysts to be used according to the invention and the methods for their preparation are known from European Patent Specifications 101 927, 137 389 and 193 047 or they can be prepared, if not yet described in the literature, by methods similar to the known methods.

The reaction products of A, C and optionally B to be used according to the invention can be used as sole polymerization catalysts. However, it is frequently found that the concomitant use of cocatalysts gives a further improved result.

Suitable cocatalysts are in principle compounds having acid character (both Lewis and Brönstedt acids). Such acid compounds include, for example, organic aluminium halides such as $RAlCl_2$, $R_2AlCl$, $R_3Al_2Cl_3$ (in each case $R=C_1$–$C_{20}$-, preferably $C_1$–$C_4$-alkyl). Preferred cocatalysts also include the compounds described in U.S. Patent Specification 5,155,188 and having the formulae

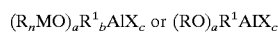

where m is silicon, tin, germanium, lead or aluminium,

R, $R^1$ are, independently of one another, alkyl, alkylene, alkinyl, aryl, aralkyl, aralkylene or aralkinyl each having up to 18 carbon atoms, preferably $C_1$–$C_3$-alkyl or phenyl and, if M=Al, either R or $R^1$ is halogen, X is chlorine, fluorine, bromine or iodine, preferably chlorine, a is from 0.5 to 2.5, preferably from 1 to 0.75, b is from 0.25 to 2, preferably from 0.5 to 1, c is from zero to 2, preferably from 0.72 to 1.25, a+b+c is 3, n is 2 (if M=Al) or 3.

Replacement of the groups (RO) by $R_3SiO$ enables cocatalysts containing siloxy groups to be effectively prepared.

Further preferred cocatalysts are aluminoxanes, i.e. 1:1 reaction products of organoaluminium compounds with water, e.g. methylaluminoxane (MAO).

Furthermore, activation is generally effected by introducing (usually bulky) weakly coordinating or non-coordinating anions into the ligand field of the central metal so that, taking a heuristic view, one coordination site is easily made free or is available for the interaction with the monomer to be polymerized.

The generation of such anions in the vicinity of the central metal is achieved, for instance, by reaction with Bronstedt acids HX, where X can be, for example, trifluoromethyl-sulphonate. Other anions suitable as cocatalysts are, for instance, $PF_6^-$, $SbF_6^-$, $SnCl_3^-$ and perchlorate.

Such anions can also be introduced using salts of the respective anion, e.g. alkali metal, alkaline earth metal, thallium, silver, phosphonium and ammonium salts.

Further preferred cocatalysts include boron compounds of the type $BR_3$ such as tris-(pentafluorophenyl)-borane or of the type $HBR_4$, where $BR_4$ is tetrafluoroborate, tetraphenylborate, or tetrakis-[3,5-di-(trifluoromethyl)-phenyl]-borate.

Also preferred are the salts of such borates $cat^{+BR}{}_4^-$- whose cations $cat^+$ are, for instance, selected from the group consisting of Na, K, Li, Mg, Ca, Ag, Tl, triphenyl-methyl, $N^+(C_1-C_{12}\text{-alkyl})_4$ and, in particular, N,N-dialkyl-anilinium ions.

Catalyst and cocatalyst can be added separately or together. During the reaction, catalyst and cocatalyst can be present in the form of a complex. It is possible to form this complex in situ or to form it in a separate reaction and to add it to the reaction in this pre-prepared form (in solution) or isolated (as solid).

Cycloolefins to be polymerized using the catalysts of the invention include all cycloolefins such as cyclobutene, cyclopentene and cyclopentadiene, but also polycyclic cycloolefins as are described in EP-A-608 903, i.e.
bicyclo-2-heptenes,
tricyclo-3-decenes,
tricyclo-3-undecenes,
tetracyclo-3-dodecenes,
pentacyclo-4-pentadecenes,
pentacyclopentadecadienes,
pentahydro-3-pentadecenes,
pentacyclo-4-hexadecenes,
pentacyclo-3-hexadecenes,
hexacyclo-4-heptadecenes,
heptacyclo-5-eicocenes,
heptacyclo-4-eicocenes,
heptacyclo-5-heneicocenes,
octacyclo-5-dococenes,
nonacyclo-5-pentacosenes,
nonacyclo-6-hexacosenes,
cyclopentadiene/acenaphthylene adducts,
1, 4-methano-1.4.4a.9a-tetrahydrofluorenes and
1, 4-methano-1.4.4a.5.10.10a-hexahydroanthracenes, for example
bicyclo[2.2.1]hept-2-ene,
6-methylbicyclo[2.2.1]hept-2-ene,
5,6-dimethylbicyclo[2.2.1]hept-2-ene,
1-methylbicyclo[2.2.1]hept-2-ene,
6-ethylbicyclo[2.2.1]hept-2-ene,
6-n-butylbicyclo[2.2.1]hept-2-ene,
6-isobutylbicyclo[2.2.1]hept-2-ene,
7-methylbicyclo [2.2.1]hept-2-ene,
tricyclo[4.3.0.1$^{2,5}$]-3-decene,
2-methyltricyclo[4.3.0.1$^{2,5}$]-3-decene,
5-methyltricyclo[4.3.0.1$^{2,5}$]-3-decene,
tricyclo[4.3.0.1$^{2,5}$]-3-undecene,
10-methyltricyclo[4.4.0.1$^{2,5}$]-3-undecene,
tetracyclo[4.4.0.1$^{2,5}$.1$^{7,10}$]-3-deodecene,
8-methyltetracyclo[4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-butyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-methyl-9-ethyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo[4.4.0.1$^{2,5}$.1$^{7,10}$]-3-dodecene,
9,11,12-trimethyltetracyclo[4.4.0.1$^{2,5}$.1$^{7,10}$]-3-dodecene,
9-ethyl-11,12-dimethyltetracyclo[4.4.0.1$^{2,5}$.1$^{7,10}$]-3-dodecene,
9-isobutyl-11,12-dimethyltetracyclo[4.4.0.1$^{2,5}$.1$^{7,10}$]-3-dodecene,
5,8,9,10-tetramethyltetracyclo[4.4.0.1$^{2,5}$.1$^{7,10}$]-3-dodecene,
8-ethylidenetetracyclo[4.4.0.1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyltetracyclo[4.4.0.1$^{2,5}$.1$^{7,10}$]-3-dodecene,
8-ethylidene-8-butyltetracyclo[4.4.0.1$^{2,5}$.1$^{7,10}$]-3-dodecene,
8-n-propylidenetetracyclo[4.4.0.1$^{2,5}$.1$^{7,10}$]-3-dodecene,
8-n-propylidene-9-methyltetracyclo[4.4.0.1$^{2,5}$.1$^{7,10}$]-3-dodecene,
8-n-propylidene-9-ethyltetracyclo[4.4.0.1$^{2,5}$.1$^{7,10}$]-3-dodecene,
8-n-propylidene-9-isopropyltetracyclo[4.4.0.1$^{2,5}$.1$^{7,10}$]-3-dodecene,
8-n-propylidene-9-butyltetracyclo[4.4.0.1$^{2,5}$.1$^{7,10}$]-3-dodecene,
8-isopropylidenetetracyclo[4.4.0.1$^{2,5}$.1$^{7,10}$]-3-dodecene,
8-isopropylidene-9-methyltetracyclo[4.4.0.1$^{2,5}$.1$^{7,10}$]-3-dodecene,
8-isopropylidene-9-ethyltetracyclo[4.4.0.1$^{2,5}$.1$^{7,10}$]-3-dodecene,
8-isopropylidene-9-isopropyltetracyclo[4.4.0.1$^{2,5}$.1$^{7,10}$]-3-dodecene,
8-isopropylidene-9-butyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene,
8,9-dichlorotetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
1,3-dimethylpentacyclo[6.5.1.1$^{3,6}$.0$^{2,7}$.0$^{9,13}$]-4-pentadecene,
1,6-dimethyl[6.5.1.1$^{3,6}$.0$^{2,7}$.0$^{9,13}$]-4-pentadecene,
14,15-dimethyl[6.5.1.1$^{3,6}$.0$^{2,7}$.0$^{9,13}$]-4-pentadecene,
pentacyclo[7.4.0.1$^{2,5}$.1$^{9,12}$.0$^{8,13}$]-3-pentadecene,
methyl-substituted pentacyclo[7.4.0.1$^{2,5}$.1$^{9,12}$.0$^{8,13}$]-3-pentadecene,
pentacyclo[6.5.1.1$^{3,6}$.0$^{2,7}$.0$^{9,13}$]-4,10-pentadecadiene,
pentacyclo[8.4.0.1$^{2,5}$.1$^{9,12}$.0$^{8,13}$]-3-hexadecene,
11-methylpentacyclo [8.4.0.1$^{2,5}$.1$^{9,12}$.0$^{8,13}$]-3-hexadecene, 11-ethyl[8.4.0.1$^{2,5}$.1$^{9,12}$.0$^{8,13}$]-3-hexadecene,
10,11-dimethyl[8.4.0.1$^{2,5}$.1$^{9,12}$.0$^{8,13}$]-3-hexadecene,
pentacyclo[6.6.1.1$^{3,6}$.0$^{2,7}$.0$^{9,14}$]-4-hexadecene,
1,3-dimethylpentacyclo[6.6.1.1$^{3,6}$.0$^{2,7}$.0$^{9,14}$]-4-hexadecene,
15,16-dimethylpentacyclo[6.6.1.1$^{3,6}$.0$^{2,7}$.0$^{9,14}$]-4-hexadecene,
hexacyclo[6.6.1.1$^{3,6}$.1$^{10,13}$.0$^{2,7}$.0$^{9,14}$]-4-heptadecene,
12-methylhexacyclo[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene,
1,6,10-trimethylhexacyclo[6.6.1.1$^{3,6}$.1$^{10,13}$.0$^{2,7}$.0$^{9,14}$]-4-heptadecene,
heptacyclo[8.7.0.1$^{2,9}$.1$^{4,7}$.1$^{11,17}$.0$^{3,8}$.0$^{12,16}$]-5-eicosene,
heptacyclo[8.7.0.1$^{3,6}$.1$^{10,17}$.1$^{12,15}$.0$^{2,7}$.0$^{11,16}$]-4-eicosene and its dimethyl-substituted derivatives,
heptacyclo[8.8.0.1$^{2,9}$.1$^{4,7}$.1$^{11,18}$.0$^{3,8}$.0$^{123,17}$]-5-heneicosene,
heptacyclo[8.8.0.1$^{4,7}$.1$^{11,18}$.1$^{13,16}$.0$^{3,8}$.0$^{12,17}$]-5-heneicosene and its trimethyl-substituted derivatives,
15-methylheptacyclo[8.8.0.1$^{4,7}$.1$^{11,18}$.1$^{13,16}$.0$^{3,8}$.0$^{12,17}$]-5-heneicosene
5-phenyl-bicyclo[2.2.1]hept-2-ene,
5-methyl-5-phenyl-bicyclo[2.2.1]hept-2-ene,
5-benzyl-bicyclo[2.2.1]hept-2-ene,
5-tolyl-bicyclo[2.2.1]hept-2-ene,
2-(ethylphenyl)-bicyclo[2.2.1]hept-2-ene,
5-(isopropylphenyl)-bicyclo[2.2.1]hept-2-ene,
5-biphenyl-bicyclo[2.2.1]hept-2-ene,
5-(β-naphthyl)-bicyclo[2.2.1]hept-2-ene,
5-(α-naphthyl)-bicyclo[2.2.1]hept-2-ene,
5-(anthracenyl)-bicyclo[2.2.1]hept-2-ene,
5,6-diphenyl-bicyclo[2.2.1]hept-2-ene,
1,4-methano-1.4.4a.9a-tetrahydrofluorene,
1,4-methano-1.4.4a.5.10.10a-hexahydroanthracene,
8-phenyltetracyclo[4.4.0.1$^{2,5}$.1$^{7,10}$]-3-dodecene,
8-methyl-8-phenyltetracyclo[4.4.0.1$^{2,5}$.1$^{7,10}$]-3-dodecene,
8-benzyl-tetracyclo[4.4.0.1$^{2,5}$.1$^{7,10}$]-3-dodecene,
8-tolyl-tetracyclo[4.4.0.1$^{2,5}$.1$^{7,10}$]-3-dodecene,
8-(ethylphenyl)-tetracyclo[4.4.0.1$^{2,5}$.1$^{7,10}$]-3-dodecene,
8-(isopropylphenyl)-tetracyclo[4.4.0.1$^{2,5}$.1$^{7,10}$]-3-dodecene,
8,9-diphenyl-tetracyclo[4.4.0.1$^{2,5}$.1$^{7,10}$]-3-dodecene,
8-(biphenyl)-tetracyclo[4.4.0.1$^{2,5}$.1$^{7,10}$]-3-dodecene,
8-(β-naphthyl)-tetracyclo[4.4.0.1$^{2,5}$.1$^{7,10}$]-3-dodecene,
8-(α-naphthyl)-tetracyclo[4.4.0.1$^{2,5}$.1$^{7,10}$]-3-dodecene and
8-(anthracenyl)-tetracyclo[4.4.0.1$^{2,5}$.1$^{7,10}$]-3-dodecene.

Preferred cycloolefins also include those which are substituted by halogen, —CF$_3$, —N(C$_1$—C$_{30}$-alkyl)$_2$, —CN, C$_1$—C$_{12}$-alkoxy or C$_1$—C$_{20}$-alkylene-COOC$_1$—C$_{20}$-alkyl, preferably by from one to three substituents per molecule.

The cycloolefins can also be polymerized in the presence of acyclic monoolefins or diolefins, alkines and carbon monoxide. Suitable acyclic olefins include C$_2$–C$_{40}$-α-olefins and C$_4$-C$_{24}$-diolefins, for example ethylene, propylene, 1-butene, 1-pentene, 1-hexene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene and mixtures of these α-olefins and also 1,4-butadiene, isoprene, 1,4-pentadiene, 1,5-hexadiene, 1,6-heptadiene, 1,7-octadiene, 1,8-nonadiene, 1,9-decadiene, 1,11-dodecadiene, 1,19-eicodiene and mixtures of these diolefins. Also suitable are mixtures of a-olefins and diolefins.

Such olefins and diolefins can also be substituted, for example by phenyl, substituted phenyl, halogen, the esterified carboxyl group, the acid anhydride group; compounds of this type are, for example, chloroprene, styrene, methylstyrene, chlorostyrene, fluorostyrene, indene, 4-vinyl-biphenyl, vinylfluorene, vinylanthracene, methyl methacrylate, ethyl acrylate, vinylsilane, trimethylallylsilane, vinyl chloride, vinylidene chloride, tetrafluoroethylene, isobutylene, vinylcarbazol, vinylpyrrolidone, acrylonitrile, vinyl ethers and vinyl esters. Also possible according to the invention are ring-opening polyadditions, for instance of lactones such as ε-caprolactone or δ-valerolactone, or of lactams such as ε-caprolactam. Preferred monomers are: ethylene, propylene, butene, hexene, octene, 1,5-hexadiene, 1,6-octadiene, methyl methacrylate, ε-caprolactone, δ-valerolactone and acetylene.

The catalysts and any cocatalysts can be used either as such in homogeneous form or individually or together in heterogeneous form on supports. The support material can here be of an inorganic or organic nature, for example silica gel, Al$_2$O$_3$, MgCl$_2$, cellulose derivatives, starch and polymers.

The polymerization can be carried out in solution, in a slurry, in the gas phase or in bulk. It can be carried out either continuously or batchwise. The catalyst can be initially charged and the monomers can be metered in. However, it is also possible for the monomers to be initially charged and the catalyst to be metered in. It is likewise possible for catalyst and monomers to be initially charged or catalyst and monomers to be introduced into the reaction zone in two separate streams.

The polymerization with the aid of the catalysts to be used according to the invention is preferably carried out with exclusion of water and oxygen. Organic solvents suitable for the polymerization in solution include aromatics such as toluene, chlorobenzene, nitrobenzene, chlorinated aliphatic hydrocarbons such as dichloromethane and mixtures thereof.

In the case of a batch process, the catalysts to be used according to the invention can be used in amounts corresponding to a molar ratio of from 10$^{-2}$ to 10$^{-8}$, based on monomers to be polymerized. If cocatalysts are also to be used, the molar ratio of catalyst/cocatalyst is generally from 1 to 10–6, preferably from 10$^{-1}$ to 10$^{-4}$ (in the case of aluminium-containing cocatalysts) or from 1 to 10$^{-1}$ (in the case of boron-containing cocatalysts).

The polymerizations can be carried out at temperatures of from –20 to 200° C., preferably from +20 to 160° C.

The polymers can be precipitated by means of non-solvents such as methanol and then dried.

EXAMPLES

Examples 1 to 3

Conditions

Cycloolefin: norbornene

Amount: 100 mmol

Solvent: chlorobenzene

Amount: 100 ml

Cocatalyst: hydrolysed trimethylaluminium (MAO)

Amount: 1 mmol

Temperature: 80° C.

Polymerization time: 1 hour

The results are shown in Table 1 below:

TABLE 1

| Example | Catalyst (mmol) | Yield (g/%) | Activity (t/mol*h) | Limiting viscosity* η(dl/g) | Softening point (° C.) by thermo-mechanical analysis TMA | Decomposition temperature (° C.) by DSC |
|---|---|---|---|---|---|---|
| 1 | NiPh(Ph$_2$PCHCPhO)-(iPr$_3$PCHPh) 0.001 | 8.6/91.5 | 8.6 | 1.57 | 313 | 463 |
| 2 | NiPh(Ph$_2$PCHCMeO)-(iPr$_3$PCHPh) 0.001 | 8.9/94.7 | 8.9 | 1.60 | 377 | 460 |
| 3 | NiPh(Ph$_2$PCHCMeO)-(Ph$_3$PCH$_2$) 0.001 | 5.8/61.7 | 5.8 | 1.40 | 280 | 451 |

*measured in trichloroethylene at 25° C.

Examples 4 to 7

Using a method similar to Examples 1 to 3, norbornene was polymerized using the catalyst according to the invention from Example 1 while varying the temperature and monomer/catalyst ratio (Example 5). In all cases, high catalyst activities of up to 18.6 t/mol.h were achieved. The temperature enables the achievable molar masses/limiting viscosities to be controlled.

The results are shown in Table 2.

C. a compound of the formula

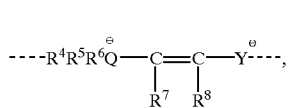
(II)

where

TABLE 2

| Example | Catalyst (mmol) | Cocatalyst (mmol) | Monomer (mmol/bar) | Solvent (ml) | Temperature (° C.) | Polymerization time (h) | Yield (g/%) | Activity (t/mol) | Limiting viscosity (dl/g) | TMA, DSC |
|---|---|---|---|---|---|---|---|---|---|---|
| 4 | NiPh(Ph$_2$PCHCPhO)-(iPr$_3$PCHPh) | MAO 1 | Norbornene 100 | Chlorobenzene 100 | 0° C. bath, exothermic to 5° C. | 1 | 4.9/52.1 | 4.9 | 2.68 | 295° C. 450° C. |
| 5 | NiPh(Ph$_2$PCHCPhO)-(iPr$_3$PCHPh) 0.001 | MAO 7 | Norbornene 700 | Chlorobenzene 700 | 20 | 1 | 18.6/28.3 | 18.6 | 2.63 | 405° C. 464° C. |
| 6 | NiPh(Ph$_2$PCHCPhO)-(iPr$_3$PCHPh) 0.001 | MAO 1 | Norbornene 100 | Chlorobenzene 100 | 40° C., briefly exothermic to 60° C. | 1 | 8.5/90.4 | 8.5 | 2.36 | 289° C. 455° C. |
| 7 | NiPh(Ph$_2$PCHCPhO)-(iPr$_3$PCHPh) 0.001 | MAO 1 | Norbornene 100 | Chlorobenzene 100 | 60° C., briefly exothermic to 74° C. | 1 | 8.6/91.5 | 8.6 | 1.89 | 408° C. 463° C. |

All polymers obtained from Examples 1 to 7 are soluble in chlorobenzene.

I claim:

1. A method for the polymerization of cycloolefins, which comprises polymerizing said cycloolefins in the presence of a catalyst which is a reaction product of A. a nickel(0) compound or a compound which can be converted in situ into a nickel(0) compound, with, optionally, B. a compound of the formula

(I)

and (obligatorily)

$R^1$ to $R^6$ are, independently of one another, straight-chain or branched $C_1$–$C_{20}$-alkyl, $C_1$–$C_{20}$-alkoxy, $C_3$–$C_8$-cycloalkyl, $C_2$–$C_{20}$-alkenyl, di-($C_1$–$C_4$-alkyl)amino, $C_6$–$C_{12}$-aryloxy, $C_7$–$C_{15}$-aralkyl, $C_7$–$C_{15}$-aralkoxy or $C_6$–$C_{12}$-aryl, E and Q are, independently of one another, nitrogen, phosphorus, arsenic or antimony, X is oxygen, sulphur, =NR$^9$, =CR$^9$R$^{10}$, =C=C=O, =C=C=S, =C=PR$^1$R$^2$R$^3$, Y is oxygen or NR$^9$, $R^7$, $R^8$ are, independently of one another, hydrogen, $C_1$–$C_{20}$-alkyl, $C_2$–$C_{20}$-alkenyl, $C_1$–$C_{20}$-alkoxy, $C_3$–$C_8$-cycloalkyl, $C_6$–$C_{12}$-aryl, $C_6$–$C_{12}$-aryloxy, $C_6$–$C_{12}$-ar-$C_1$–$C_{20}$-alkyl, $C_6$–$C_{12}$-ar-$C_1$–$C_{20}$-alkoxy, $C_1$–$C_{20}$-alkyl-$C_6$–$C_{12}$-aryl, $C_1$–$C_{20}$-alkyl-$C_6$–$C_{12}$-aryloxy, chlorine, cyano, NHR$^{12}$, NR$^{12}_2$, OR$^{12}$, COOR$^{12}$, COOR$^{11}$, CONR$^{12}$, COR$^{12}$, SR$^{12}$, SO$_2$R$^{12}$, OSO$_2$R$^{12}$, P(O)(OR$^{12}$)$_{2-y}$R$^{13}{}_y$, R$^7$ may also be SO$_3$R$^{11}$ or R$^7$ and R$^8$ together with the two carbon atoms to which they are bound form an isocyclic or heterocyclic ring, R$^9$ and R$^{10}$ are, independently of one another, R$^1$ or hydrogen, silyl, acyl, chlorophenyl, nitrophenyl, C$_1$–C$_6$-alkylphenyl, cyano, phenyl-C$_2$–C$_6$-alkenyl, silyl, trihalogenosilyl, tri-C$_1$–C$_{30}$-organosilyl, C$_1$–C$_{16}$-acyl, cyano, halogen, tri-C$_1$–C$_{30}$-organostannyl, -BH$_2$, di-C$_1$–C$_{20}$-organoboranyl, dihalogenoboranyl, R$^{11}$ is an alkali metal, thallium, 1/2 alkaline earth metal, ammonium, phosphonium, C$_1$–C$_{12}$-alkyl or C$_6$–C$_{12}$-aryl, R$^{12}$, R$^{13}$ are, independently of one another, C$_1$–C$_{20}$-alkyl, C$_2$–C$_{20}$-alkenyl, C$_3$–C$_8$-cycloalkyl or C$_6$–C$_{12}$-aryl and y is zero, 1 or 2.

2. Method according to claim 1, wherein the reaction product has the structural feature

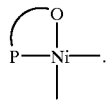
(III)

3. Method according to claim 1, wherein the reaction product has the formula

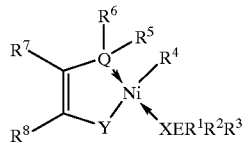
(IV)

where

E, Q, X, Y and R$^1$ to R$^8$ are as defined in claim 1.

4. Method according to claim 1 in the presence of an acid cocatalyst.

5. Method according to claim 1 at a temperature of from −20 to 200° C.

UNITED STATES PATENT AND TRADEMARK OFFICE
CERTIFICATE OF CORRECTION

PATENT NO.    : 6,040,403
DATED         : March 21, 2000
INVENTOR(S)   : Karl-Heinz Aleksander Ostoja Starzewski It is certified that error appears in the above-identified patent and that said Letters Patent is hereby corrected as shown below:

COLUMN 12:
Line 22-25 delete the dashes (--) at the beginning and end of the formula Signed and Sealed this Twelfth Day of June, 2001

*Attest:*

NICHOLAS P. GODICI
*Attesting Officer*   *Acting Director of the United States Patent and Trademark Office*